Patented Feb. 9, 1932

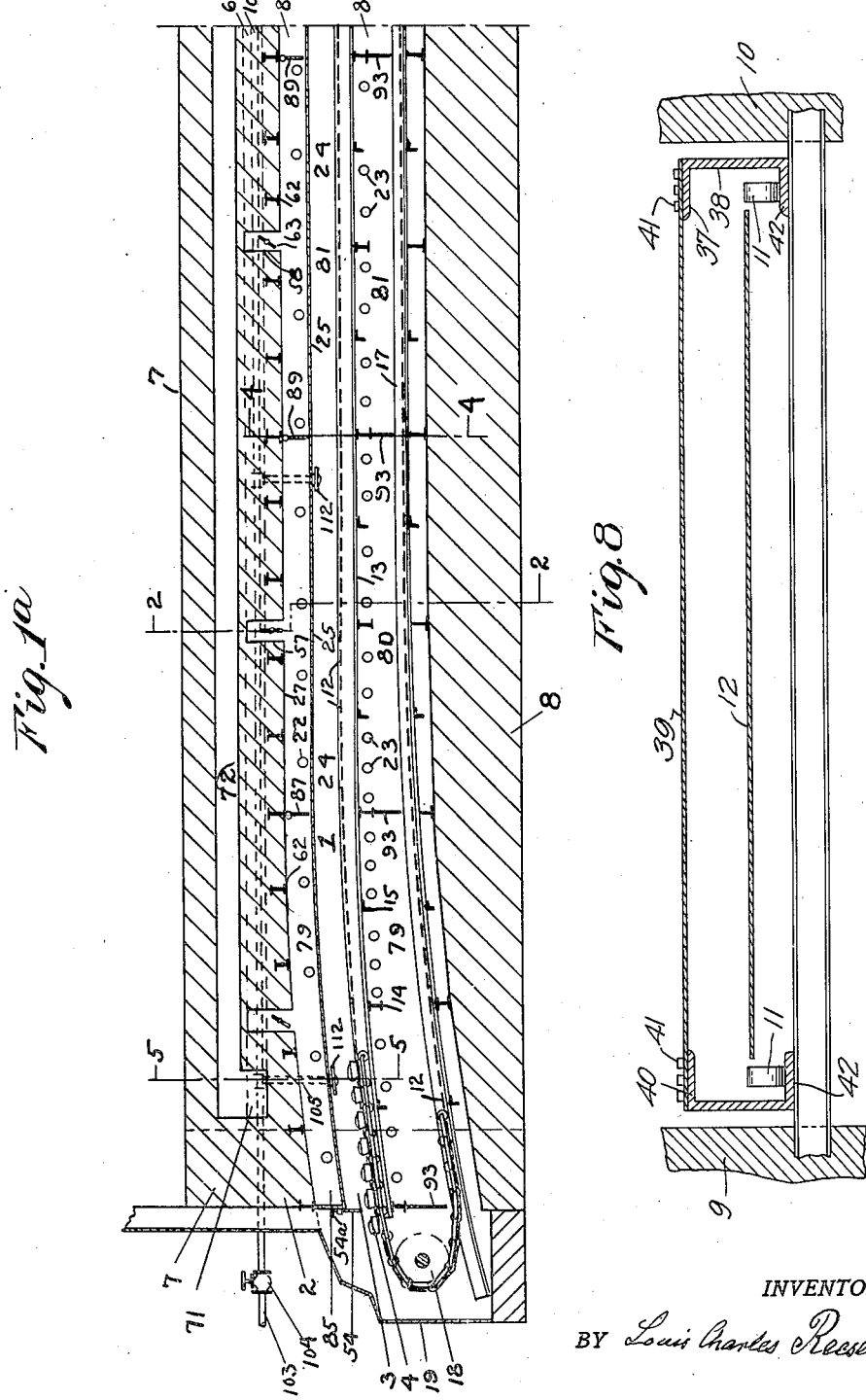

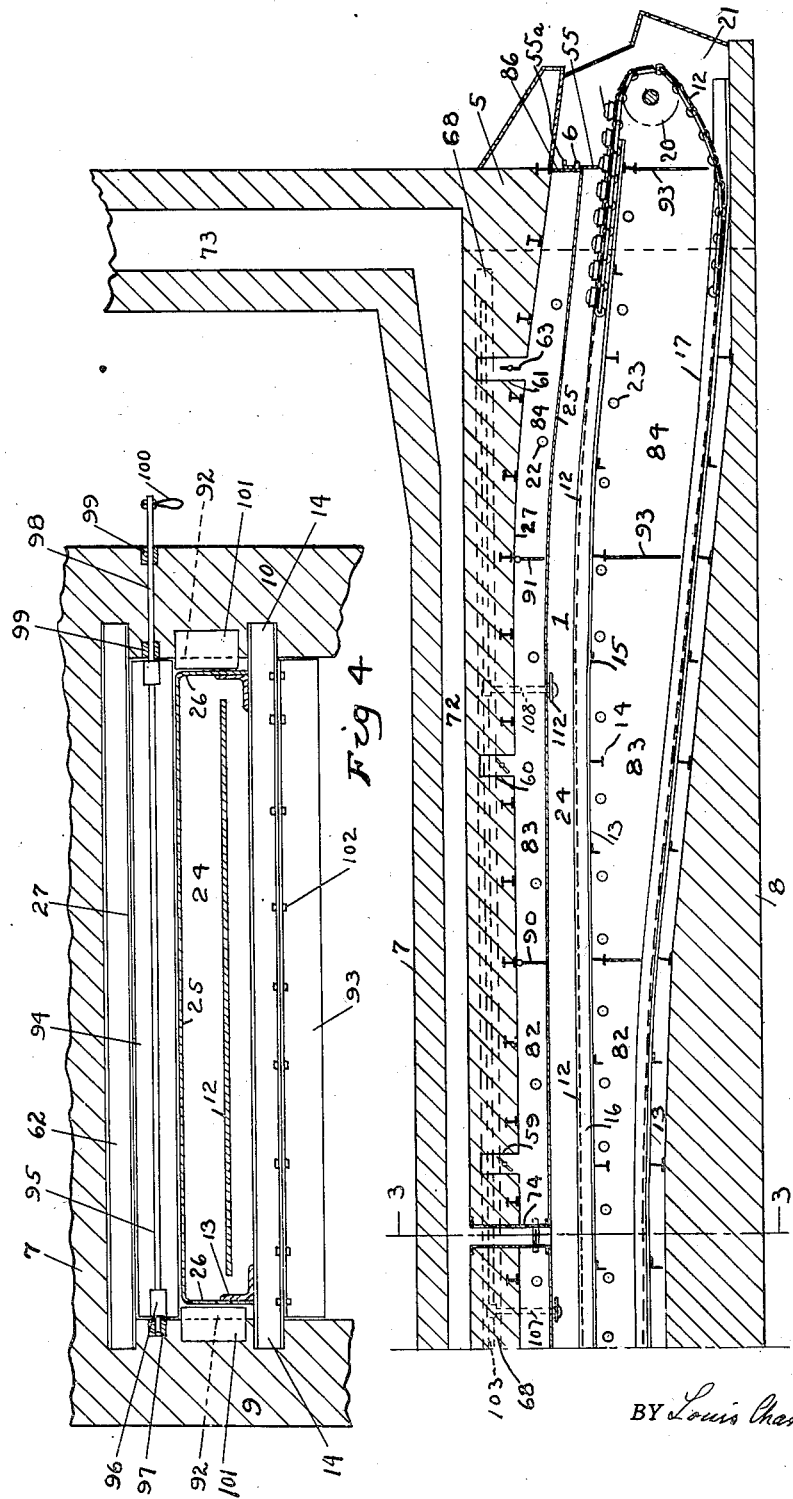

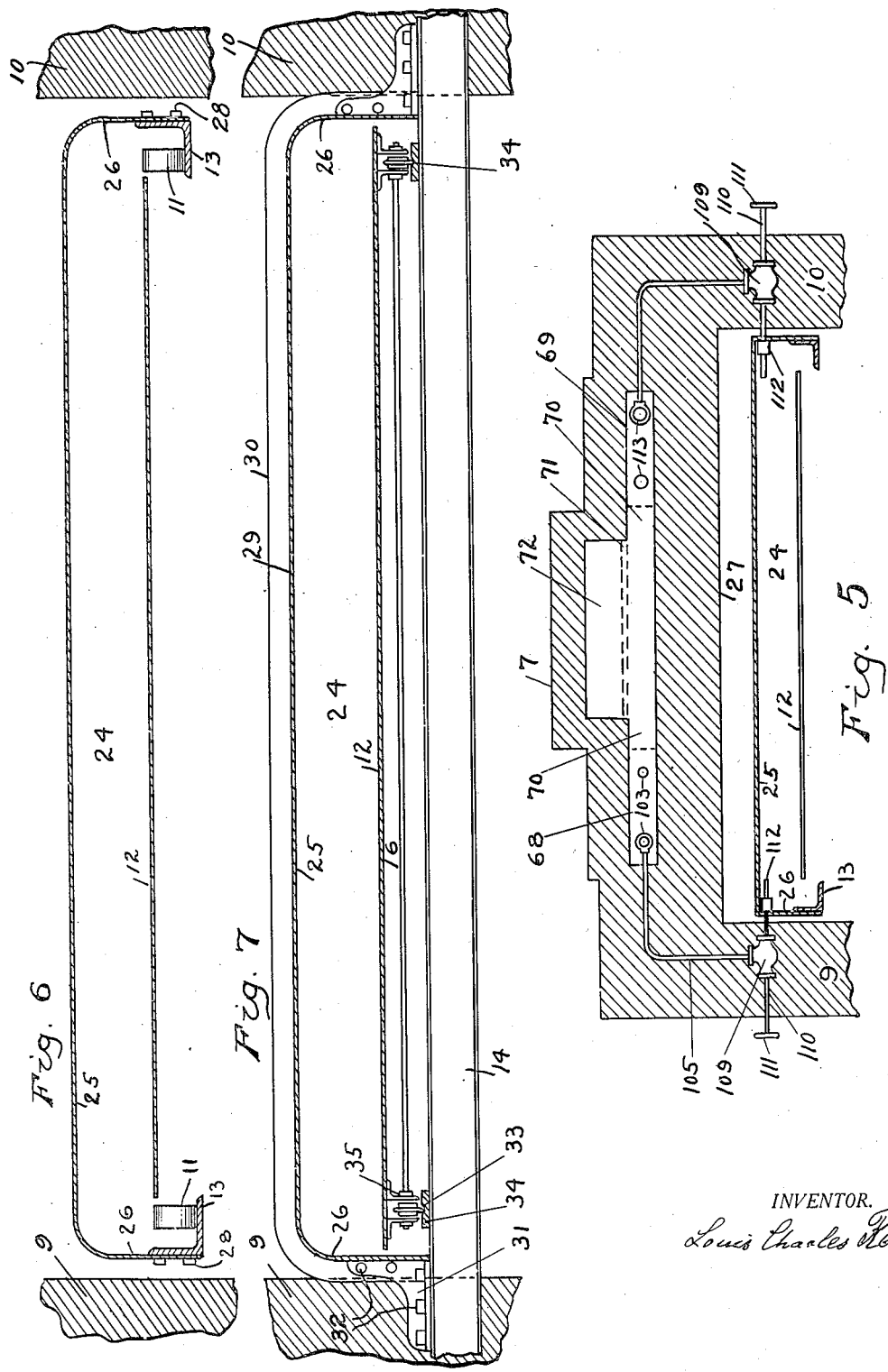

1,844,178

UNITED STATES PATENT OFFICE

LOUIS CHARLES REESE, OF SAGINAW, MICHIGAN, ASSIGNOR TO BAKER PERKINS COMPANY, INC., OF SAGINAW, MICHIGAN, A CORPORATION OF NEW YORK

GAS FIRED TRAVELING OVEN FOR BAKING BREAD AND OTHER ARTICLES OF FOOD

Application filed January 14, 1929. Serial No. 332,518.

My invention relates to improvements in traveling ovens for baking bread and similar articles of food, in which the pieces of bread dough or the like to be baked are carried by a conveyer longitudinally through the baking chamber of the oven, entering the same at one end in the raw state and leaving it perfectly baked at the opposite end, and in which the heat necessary for the baking operation is supplied by producing fresh combustion gases within or by leading them into the baking chamber of the oven.

The objects of my invention are:

First, to provide simple means to confine the articles being baked in an atmosphere chiefly consisting of steam;

Second, to regulate easily and accurately the heat supplied to the articles being baked in the successive zones of the baking chamber in accordance with the successive phases of the baking operation, and Third, to facilitate the utilization of the hot waste gases leaving the baking chamber; all being for the purpose to render the baking operation more efficient, expeditious and considerably cheaper.

I attain these and further objects mentioned hereafter by placing a hood having the shape of an inverted channel over the articles being baked and that part of the conveyer carrying them through the baking chamber, and by other constructions and arrangements of parts, which are illustrated in the accompanying explanatory drawings, in which:—

Fig. 1, divided by reasons of the great length of the oven into two sections, Figs. 1ª and 1ᵇ, represents a longitudinal vertical section through a traveling bread baking oven, to which my invention is applied;

Fig. 2 is a vertical cross section on line 2—2, Fig. 3 on line 3—3, Fig. 4 on line 4—4 of Fig. 1 and Fig. 5 on line 5—5 of Fig. 1;

Fig. 6 is a somewhat enlarged cross section of the hood employed in Fig. 1;

Fig. 7 is a similar cross section of the same type of hood shown in Fig. 6, but supported by different means;

Fig. 8 is a similar cross section of a hood composed of channel irons and plain plates;

Similar numerals refer to similar parts throughout the several figures.

Figure 2:
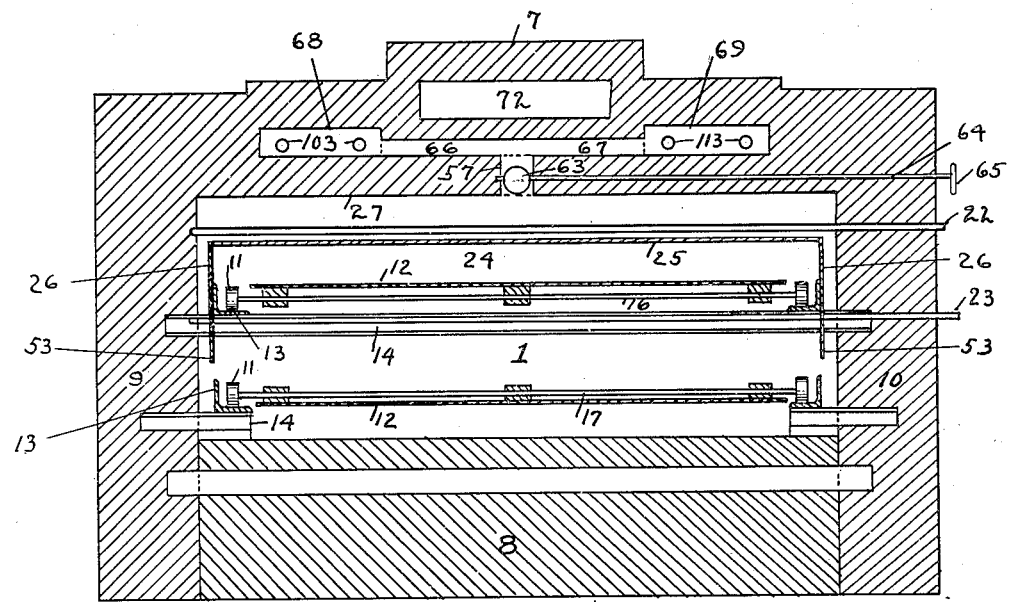

The numeral 1 indicates the baking chamber of the oven, 2 its front wall provided with the opening 3, where the pans 4 containing the dough pieces to be baked enter, 5 its back wall having the opening 6, where the completely baked bread loaves in pans 4 leave, 7 its top, 8 its bottom and 9 and 10 its side walls. The baking chamber 1 contains an endless conveyer, which consists of two parallel wheeled chains 11, to which the plates 12 carrying the articles to be baked are suitably secured. The wheels of the chains 11 run on stout angle irons 13 extending throughout the length of the baking chamber 1 and supported on I-beams or T-irons 14 and angle irons 15 extending at intervals across the baking chamber, or for some distance from its side walls into the same. The conveyer has two superimposed flights 16 and 17, the upper one, 16, carrying the articles being baked, and the lower one, 17, being the return flight for the empty carrier plates 12, and is driven by sprocket wheels 18 located in the forechamber 19 at the front end, and 20 located in the forechamber 21 at the back end of the baking chamber 1. The latter is usually heated by two rows of burners extending across the baking chamber 1, 22 above the upper conveyer flight 16 and the articles thereon, and 23 closely beneath the same flight. The burners are usually supplied in this class of oven with a mixture of a suitable fuel gas with the substantially exact amount of air necessary for its complete combustion.

In order to produce well-risen bread loaves of the fine and light texture of crumb and the even surface and fine color of crust demanded by the customers, it is necessary to bake the dough pieces, from which the loaves are produced, in an atmosphere consisting practically of steam only, or at least containing a very high percentage of the same; this fact is well-known in the trade. As the combustion gases used for heating the described oven contain only a very small and negligible amount of steam, and, as the quantity of steam emanating from the dough loaves being baked is quite insufficient to form with the combustion gases an atmosphere of the baking chamber containing the required high percentage of steam, it is necessary to introduce fresh steam from outside into the baking chamber in order to produce by its addition the required composition of the atmosphere, in which the bread is baked. This added steam must not only be first taken from a separate source, but must be heated to the always considerably higher temperature of the baking chamber. This addition and heating of outside steam, which is required in only too frequent cases in extremely large quantities, is not only very costly, but complicates the operation of the oven and renders its supervision more difficult and tedious.

In order to avoid this difficulty and its costs, I cover the articles being baked and the upper conveyer flight 16 carrying the same by a stationary hood 24 made of good heat-conducting metal, having the shape of an inverted channel and extending throughout the length of the baking chamber 1 from its front to its back. The top 25 of the hood 24 is placed as near to the top of the articles being baked as their requirements for being properly baked will permit, and the sides 26 of the same are arranged at such a distance from the side walls 9 and 10 of the baking chamber, that the combustion gases can pass freely from the space below the upper conveyer flight 16 to the space between the top of the hood 24 and the ceiling 27 of the baking chamber.

The hood 24 may be of any shape corresponding to the largest cross section of the articles passing through the baking chamber 1; generally it is either oblong, as shown in Figs. 2–5 and 8 or curved at the edges connecting its top and sides, as shown in Figs. 6 and 7.

The rather long hood 24, which must be vapor-tight, is composed of suitable plates fitted and joined together in any convenient known manner, and is carried by and fixed to the stationary supports of the conveyer.

In Figs. 1–6 the lower parts of the sides 26 of hood 24 are secured to the upright legs of the angle irons 13 by screws 28, as shown for instance especially in Fig. 6, in which the top 25 and sides 26 of hood 24 are integral.

A slightly different arrangement is shown in Fig. 7. The plates 29, of which hood 24 is composed, are curved so as to form the top 25 and sides 26 of the same and joined together by being fixed to the flanges of correspondingly curved T-irons 30. The upright ends of the latter are connected to the top flanges of I-beams 14 by means of gussets 31 fixed to the latter and to the webs of the T-irons 30 by means of screws 32. Suitable incombustible packing is used, as in all such cases, for making the joints vapor-tight. The wheels 33 of the conveyer chains employed in this case run in the grooves of rails 34 supported by the I-beams 14, and their inner links are provided with bracket-line projections 35 carrying the plates 12. In this way the side edges of the latter may approach the sides 26 of hood 24 more closely than is possible in the construction shown in other figures, an arrangement which is of great advantage in frequent cases.

Fig. 8 shows a hood, in which two channel irons 36 and 37 of equal depth are placed with their webs 38 upright and their open faces opposite to each other on the I-beams 14 at such a distance from the corresponding side walls of the baking chamber, that the interstices between the latter and the channel irons allow free passage of the gases therethrough. The width of these channel irons is determined in accordance with the required height of the hood 24. The top of the latter is formed by attaching straight plates 39 to the top flanges 40 of the channel irons by screws 41. The wheels of the conveyer chains 11 run on the inner surfaces of the bottom flanges 42 of the channel irons. The construction excels by its simplicity.

In cases, where it is intended to heat the bottom part of the articles to be baked more intensely, the fresh combustion gases may be retained below the plate 12 for a somewhat longer time by prolonging the sides 26 of the hood 24 downwardly, as shown in Fig. 2, where these elongations are indicated by the numeral 53.

In order to prevent the gases, mostly steam, from escaping from underneath the hood 24, the latter follows in outline that of the upper flight of the conveyer, which is downwardly inclined at the front and back of the baking chamber, as is usual in this type of oven, and the open ends of the hood are provided with baffles 54 and 55, which are preferably made adjustable in any suitable manner, as for instance by handle-like means 54$^a$ and 55$^b$ shown in Fig. 1$^a$ and 1$^b$ respectively. The baffle 54 located at the front end of the hood extends with its lower edge closely to the top of the dough pieces or other articles charged into the baking chamber, and the baffle 55 located at the back end of the hood closely to the top of the baked bread loaves or other articles leaving the same.

The used combustion gases are removed from the top part of the baking chamber through tubes 56, 57, 58, 59, 60 and 61, (Fig. 1), arranged preferably in the longitudinal center line of its ceiling 27, which is supported by I-beams 62. Butterfly-valves 63 operated by rod 64 and handle 65 (Fig. 2) control the quantity of gases leaving through the tubes 56—61, from which they pass through branch pipes 66 and 67 to the flues 68 and 69 extending within the top 7 of the oven along opposite sides of the baking chamber and preferably made of considerable breadth in order to contribute as much as possible to the heating of the same. The gases move in the flues 68 and 69 from the back part of the oven towards its front. Here (Fig. 5) the two currents are combined by passing through side extensions 70 to the flues and the short upwardly leading connecting flue 71 to the broad main flue 72. The latter runs above the middle part of the baking chamber 1 towards its back, and ends in the chimney 73 erected on the back end of the oven. Instead of a chimney a suction fan may be employed in the well-known manner for the removal of the waste gases. Its installation would in no way require an alteration of the construction described for the application of my invention.

If the removal of the used combustion gases is properly regulated in accordance with the quantity of fuel gas and air burnt, the pressure of the atmosphere underneath the hood on the articles being baked shows hardly any difference from that of the outside atmosphere, but in cases, in which this pressure might be exceeded so that the loaves do not rise well, or where a change of the composition of the atmosphere underneath the hood is necessary or advisable, the required portion of the gases must be removed from underneath the hood. Figs. 1ᵇ and 3 show a device 74 answering this purpose. It is placed in the middle part of the baking chamber 1 and consists of a metal tube 75 connected at its lower end to the top of the hood 24 and at its upper end to the main flue 72. The quantity of gases passing therethrough is regulated by the well fitting and tightly closing gate valve 76 operated by rod 77 and handle 78. A plurality of such outlet devices may be employed, if desired.

In order to heat so long a traveling oven as described, in accordance with the different phases of the baking operation, the baking chamber thereof is frequently divided into a number of heating zones. No rule can be given in regard to the number of zones, as each different kind of articles to be baked in the oven requires a different number thereof; but it is obvious, that the more numerous the zones, the more accurately the heat supplied may be regulated according to the requirements of the various phases of the baking operation, and the more easier changed according to those of the different articles, which are baked in the course of the use of the oven. For this purpose, in the oven shown as example in Fig. 1, I divide the baking chamber 1, with exception of the space covered by the hood 24, into six different heating zones 79, 80, 81, 82, 83 and 84, the used gases being removed separately from each zone through the tubes 56, 57, 58, 59, 60 and 61 respectively, which are preferably arranged in their midst. These zones are formed by completely closing at the front and back end of the baking chamber 1 the openings encircled by the hood 24, the ceiling 27 and the upper parts of the side walls 9 and 10 of the baking chamber by means of plates 85 and 86 respectively fixed to their surroundings, by arranging in the long space closed as described and encircled by the ceiling 27, top 25 of hood 24 and the corresponding top parts of the side walls 9 and 10, partitions 87, 88, 89, 90 and 91 by placing between the sides 26 of the hood 24 and the side walls 9 and 10 stationary partitions 92, (Fig. 2), and by arranging in the space between the upper and lower flights of the conveyer baffles 93 extending the whole width of the baking chamber, and reaching downwardly closely to the lower conveyer flight.

The plates 85 and 86 at the front and back end of the baking chamber are aligned with the stationary partition 92 and the baffles 93 located at these points, and the three members of each of the five partitions situated between the front and back end of the baking chamber are in vertical alignment. In order to facilitate this construction, I preferably locate I-beams 62 carrying the ceiling 27 and I-beams 14 supporting the upper flight 16 of the conveyer at the points, where the partitions and flaps mentioned are to be placed. In order to be able, if desired, to vary the size and effect of the various zones, the partitions 87, 88, 89, 90 and 91 may be made adjustable, an instance of which arrangement is given in Fig. 4.

Fig. 4 shows the arrangement of the three partition members. In the same the partition 88 consists of a plate 94 strengthened along its middle line by a bar 95 fixed at one end to a short shaft 96 revolubly mounted in the cup-like bearing 97 rigidly fixed in the side wall 9 and at the opposite end to a shaft 98 extending through and outside the side wall 10, rotating in bearings 99 arranged in the latter and carrying at its end affixed thereto a handle 100 for operating the device. The stationary partition 92 consists of a straight plate fixed with one end 101 in a side wall of the baking chamber and extending with its other end closely to the side wall 26 of hood 24. In Figs. 7 and 9 hoods are shown, in which the plates forming the same are joined by devices, which project vertically from the hood, and may thus take the place of the partition plates 92. The baffles 93 also consist of straight plates, which are preferably provided at their upper ends with flanges attached to the bottom flanges of the I-beams 14 by means of screw bolts 102, and may also be made adjustable.

When an oven of the type described is heated up for starting to bake, the space underneath the hood 24 will soon be filled with combustion gases. When bread or similar products, which must be baked in an atmosphere of steam, are to be placed into the oven, the combustion gases must be removed from underneath the hood 24 and replaced by steam, before the dough loaves to be baked are charged into the baking chamber. To this end, I introduce preheated steam into the space underneath hood 24 a short time before baking starts, using for this purpose the apparatus shown in Figs. 1 and 5. The steam taken from any suitable source is led into the oven through pipe 103 provided with stopcock 104. The pipe 103 passes through the front wall 2 and extends in shape of a U within flue 68 for its whole length, the return part of the pipe being closed. Thus the steam contained in pipe 103 is preheated by the still hot waste combustion gases leaving the baking chamber. Branch pipes 105, 106, 107 and 108 are connected to the return bend of pipe 103, turn first sidewise within the top of the oven, then downwards within the side wall 9, until level with the upper part of hood 24, and finally sidewise into the baking chamber and into the hood 24 through its side walls 26. Each branch pipe is provided with a control and stop valve 109, Fig. 5, operated by rod 110 and handle 111 and within hood 24 with a spreader 112 of any suitable construction, adapted to distribute the introduced steam throughout the region, which it is intended to supply.

As soon as the first dough loaves placed onto the conveyer are carried by the same into the baking chamber slightly beyond branch pipe 105, its valve 109 is immediately and completely closed; after the first dough loaves have then passed, the branch pipe 106, the supply of steam therethrough is shut off, and the same takes place after the loaves passed the successive branch pipes 107 and 108. During the baking operation the steam produced thereby from the dough loaves is sufficient to maintain the required high percentage of steam in the atmosphere underneath hood 24.

Figure 3:
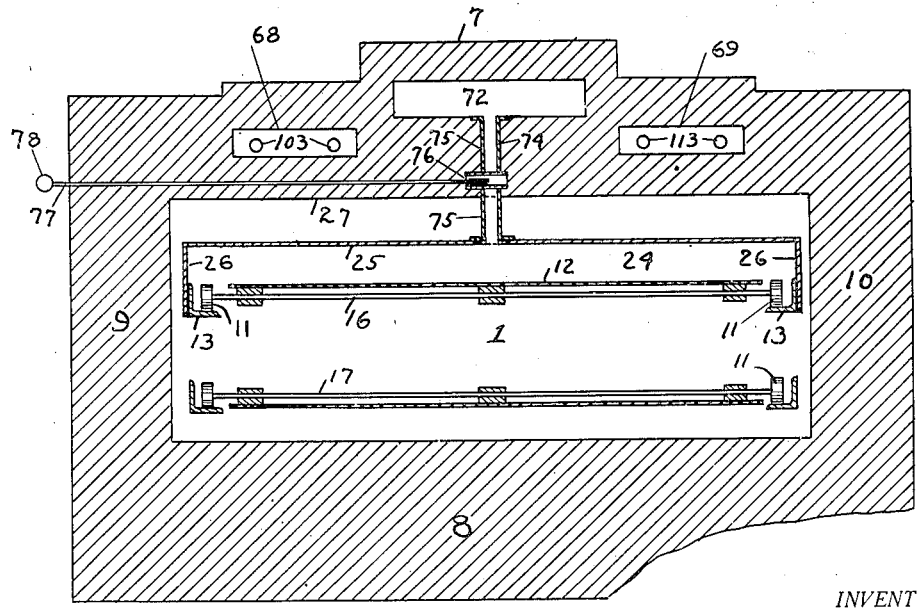

Figs. 2, 3 and 5 show within flue 69 in cross section a bent pipe 113, which is intended for the introduction of preheated air or any other gas desired into the space underneath hood 24, for which purpose it has preferably connected thereto the required number of branch pipes provided with control valves and spreaders quite similar to the devices used for the introduction of steam, and described in the previous paragraphs.

A particular embodiment of my invention having been described in the above and illustrated in the accompanying drawings, it will be understood that I do not wish to be limited to this particular embodiment, as it is obvious that numerous changes may be made in the devices used and their arrangement without in any way departing from the spirit of the invention or exceeding the scope of my claims.

I claim:

1. A traveling plate oven having in combination an elongated baking chamber internally heated by hot combustion gases, a conveyer carrying on plates the goods to be baked through said baking chamber, stationary supports for said conveyer, a metal hood fixed to the said stationary supports, extending the whole length of said baking chamber, open at both its ends and its bottom and consisting of a top part positioned at some distance from the ceiling of said baking chamber and two sides running downwardly from this top part and substantially parallel to the side walls of said baking chamber, the said hood covering the goods being baked and the said conveyer, which carries them, and which, traveling between the sides of said hood, forms the moving bottom of their reduced baking space, the top part of said hood being arranged so near to the tops of the goods being baked as to secure their quick and proper baking, and the sides of said hood being placed at such a distance from the side walls of said baking chamber, that the hot gases contained in the space between the bottom of said baking chamber and said conveyer pass through these intervals into the space between the ceiling of said baking chamber and the top part of said hood, and openings provided in the ceiling of said baking chamber for the removal of the waste gases from the same.

2. A traveling plate oven having in combination an elongated baking chamber, a conveyer carrying the articles to be baked through said baking chamber, supports carrying that part of said conveyer holding the articles being baked and extending the whole length of said baking chamber at a distance from the side walls thereof, spaced bars fixed in the side walls of said baking chamber, extending across the latter and carrying said supports, angle-shaped brackets fixed with their horizontal arms on the top of said bars so as to point to the nearest side wall of said baking chamber, their upright arms being placed closely to said supports, and a metal hood shaped like an inverted channel, its side walls extending downwardly to the said bars, fixed to the upright arms of said brackets at such points that its top is as close to the top of the articles being baked as to bake them properly and quickly.

3. A traveling plate oven having in combination an elongated, gas fired baking chamber, a stationary metal hood having the shape of an inverted channel extending throughout the whole length of said baking chamber and open at both ends, a wheeled chain conveyer carrying the goods to be baked through said baking chamber on its upper flight traveling within the lower part of said hood, angle irons extending longitudinally through said baking chamber, one leg of the same being horizontal and serving as runway for the wheels of said chain conveyer, and the other one pointing upwardly toward the ceiling of said baking chamber at the side of the upper flight of said conveyer and having the side walls of said hood affixed thereto in such a manner that the top of the latter is situated so closely to the tops of the goods being baked as to bake them quickly and properly, the distance of the upright legs of said angle irons and of the side walls of said hood affixed thereto from the side walls of the said baking chamber being such, that the spaces between them form free passages for the heating gases between the space below the upper flight of said conveyer and the space above said hood, and stationary spaced supports for said angle irons.

4. A traveling plate oven having in combination an elongated baking chamber heated by heating gases, a wheeled chain conveyer carrying the articles to be baked through said baking chamber on its upper flight, spaced supports for this upper flight of said conveyer, a stationary metal hood shaped like an inverted channel, extending the whole length of said baking chamber and composed of two channel irons, each having its bottom upright, forming the side walls of said hood facing with its outer surface the nearest side wall of said baking chamber and spaced therefrom for the free passage therethrough of the heating gases, its lower flange serving as runway for the wheels of the upper flight of said conveyer, and of metal plates joined together, fixed to the upper flanges of said channel irons, and thus forming the top of the hood, this top being as high above the tops of the articles being baked as their proper baking requires, and spaced supports for said channel irons.

5. A traveling plate oven having in combination an elongated baking chamber, a conveyer carrying the articles to be baked through said baking chamber, burners arranged in the space of the latter below that part of said conveyer holding the articles being baked, a stationary metal hood having the shape of an inverted channel and extending throughout the whole length of said baking chamber with its top below the ceiling of the latter and at such a distance from the tops of the articles being baked as their proper baking requires, and with its side walls extending downwardly along the sides of that part of said conveyer holding the articles being baked at such a distance from the side walls of said baking chamber that the hot combustion gases freely pass from the space below the article-carrying part of said conveyer to the space above the top of said hood, plates arranged at each end of the latter so as to close the space between the same and the ceiling and side walls of said baking chamber, and an outlet in the latter for the escape of the waste gases.

6. A traveling plate oven having in combination, an elongated baking chamber, an endless conveyer carrying on its upper flight the articles to be baked through said baking chamber, burners arranged within the latter between the upper and lower flight of said conveyer, a stationary metal hood having the shape of an inverted channel and extending with its top below the ceiling of said baking chamber and at such a distance from the tops of the articles being baked as their proper baking requires, and with its side walls extending downwardly along the sides of the upper flight of said conveyer at such a distance from the side walls of said baking chamber as to allow the hot combustion gases to pass freely from the space below the upper flight of said conveyer to the space above the top of said hood, plates arranged at the ends of the latter between the same and the side walls and ceiling of said baking chamber, baffle plates arranged between the upper and lower flights of said conveyer in alignment with the above-named plates, and an outlet in the ceiling of said baking chamber for the escape of the waste gases.

7. A traveling plate oven having in combination an elongated baking chamber, a conveyer carrying the articles to be baked through said baking chamber, burners located below that portion of said conveyer holding the articles being baked, a stationary metal hood having the shape of an inverted channel and extending throughout the whole length of said baking chamber with its top below the ceiling of the latter and at such a distance from the tops of the articles being baked as their proper baking requires, and with its side walls extending downwardly along the sides of that part of said conveyer holding the articles being baked at such a distance from the side walls of said baking chamber that the hot combustion gases freely pass from the space below the article-carrying part of said conveyer to the space above the top of said hood, plates arranged at each end of the latter so as to close the space between the same and the ceiling and side walls of said baking chamber, partition plates arranged between the afore-named plates so as to divide the space between the top and sides of said hood and the ceiling and side walls of said baking chamber into a number of heating zones, an outlet arranged in each of these zones for the escape of the waste gases therefrom, and means for controlling the amount of gases escaping through each of said outlets.

8. A traveling plate oven having in combination an elongated baking chamber, an endless conveyer carrying on its upper flight the articles to be baked through said baking chamber, burners arranged within the latter between the upper and lower flight of said conveyer, a stationary metal hood having the shape of an inverted channel and extending throughout the whole length of said baking chamber with its top below the ceiling of the latter at such a distance from the tops of the articles being baked as their proper baking requires, and with its side walls extending downwardly along the sides of the upper flight of said conveyer at such a distance from the side walls of said baking chamber as to allow the combustion gases to pass freely from the space below the upper flight of said conveyer to the space above the top of said hood, plates arranged at each end of the latter between the same and the ceiling and side walls of said baking chamber, spaced adjustable partition plates arranged between the afore-named plates, baffle plates arranged between the upper and lower flight of said conveyer in alignment with the first-named plates and the said partition plates, and an adjustable outlet for the waste gases in the ceiling of each of the heating zones formed by two adjacent sets of the said aligned plates.

9. A traveling plate oven having in combination an elongated baking chamber, an endless conveyer carrying on its upper flight the articles to be baked through said baking chamber, burners arranged in the space below the upper flight of said conveyer, a stationary metal hood having the shape of an inverted channel and extending throughout the whole length of said baking chamber with its top below the ceiling of the latter at such a distance from the tops of the articles being baked as their proper baking requires, and with its side walls extending downwardly along the sides of the upper flight of said conveyer at such a distance from the side walls of said baking chamber as to allow the free passage of the combustion gases through the intervals thus formed, a plurality of spaced plates arranged between the ceiling and side walls of said baking chamber and the top and side walls of said hood, the two outer plates closing the space between the latter and the ceiling and side walls of said baking chamber, and the rest dividing this space into separate heating zones, outlets—one provided in the ceiling of each of the separate zones formed by the said spaced plates, flues extending longitudinally within the top of the oven along opposite side edges of said baking chamber and closed near the back end of the same, branch channels leading the waste gases from each of said outlets to each of said flues, a main flue extending between the latter, branch flues connecting the first-named flues to said main flue at the front of the oven, and a chimney, in which the said main flue ends near the back end of the oven.

10. A traveling plate oven having in combination an elongated baking chamber, a conveyer carrying the articles to be baked through said baking chamber on its upper flight, burners placed below the latter, a stationary metal hood having the shape of an inverted channel and extending throughout the whole length of said baking chamber with its top below the ceiling of the latter at such a distance from the tops of the articles being baked as their proper baking requires, and with its side walls extending downwardly along the sides of the upper flight of the said conveyer at a distance from the side walls of said baking chamber allowing the free passage of the heating gases, adjustable baffle plates arranged at each open end of said hood, an outlet provided in the top of the latter for the removal of surplus gaseous fluid underneath the same, and means for controlling the quantity of gaseous fluid passing through said outlet.

11. A traveling plate oven having in combination an elongated baking chamber, a conveyer carrying the articles to be baked through said baking chamber on its upper flight, burners placed below the latter, a stationary metal hood having the shape of an inverted channel and extending throughout the whole length of said baking chamber with its top below the ceiling of the latter at such a distance from the tops of the articles being baked as their proper baking requires, and with its side walls extending downwardly along the sides of the upper flight of said conveyer at a distance from the side walls of said baking chamber allowing the free passage of the heating gases, and means to introduce, when baking starts, steam underneath the said hood successively from the charging point to the discharging point of the articles, as the latter progress on their way underneath said hood, whereby, when the oven is heated up, the space covered by said hood may be emptied of air and combustion gases therein, and the atmosphere thereunder made advantageous for the baking of bread.

12. A traveling plate oven having in combination an elongated baking chamber, a conveyer carrying the articles to be baked through said baking chamber on its upper flight, burners placed below the latter, a stationary metal hood having the shape of an inverted channel and extending throughout the whole length of said baking chamber with its top below the ceiling of the latter at such a distance from the tops of the articles being baked as their proper baking requires, and with its side walls extending downwardly along the sides of the upper flight of said conveyer at a distance from the side walls of said baking chamber allowing the free passage of the heating gases, an outlet provided in the ceiling of said baking chamber for the waste combustion gases, a flue leading the latter to the chimney, a pipe passing through the said flue for being heated and leading a gaseous fluid under pressure suitable for the operation into the upper part of said hood above the articles being baked, means provided at the end of the pipe inside the hood for widely dispersing the gaseous fluid thereunder, and means provided in such pipe to control the quantity of gaseous fluid passing therethrough.

LOUIS CHARLES REESE.